United States Patent [19]
Aoki et al.

[11] Patent Number: 5,676,726
[45] Date of Patent: Oct. 14, 1997

[54] MATRIX AND AGRICULTURAL MATERIALS

[75] Inventors: Yukio Aoki; Masahiro Tanaka, both of Naruto, Japan

[73] Assignee: Otsuka Kagaku Kabushiki Kaisha, Osaka, Japan

[21] Appl. No.: 373,269
[22] PCT Filed: Jun. 2, 1994
[86] PCT No.: PCT/JP94/00891
§ 371 Date: Jan. 26, 1995
§ 102(e) Date: Jan. 26, 1995
[87] PCT Pub. No.: WO94/28703
PCT Pub. Date: Dec. 22, 1994

[30] Foreign Application Priority Data

Jun. 4, 1993 [JP] Japan ................. 5-134599
Jun. 4, 1993 [JP] Japan ................. 5-134600

[51] Int. Cl.⁶ ........................... C05F 11/08
[52] U.S. Cl. ................. 71/6; 71/7; 71/903; 71/904
[58] Field of Search ................ 71/6, 7, 903, 904, 71/15; 435/178, 179; 47/58

[56] References Cited

U.S. PATENT DOCUMENTS 4,859,594  8/1989  Portier ................. 435/172.1
4,937,081  6/1990  Kagotani ............... 424/498

*Primary Examiner*—Ferris Lander
*Attorney, Agent, or Firm*—Armstrong, Westerman, Hattori, McLeland & Naughton

[57] ABSTRACT

This invention has for its object to provide a matrix which finds application as a plant culture medium which is lightweight, possessed of large moisture and fertilizer holding capacities, easy to dispose of after use, and benign to the environment or a microorganism-immobilizing support capable of immobilizing a large population of microorganisms with remarkably improved long-term viability and providing for markedly improved colonization and growth rates. The matrix of this invention is composed predominantly of polysaccharide and lignin and has an internal pore structure.

4 Claims, No Drawings

MATRIX AND AGRICULTURAL MATERIALS

TECHNICAL FIELD

This invention relates to a matrix and agricultural materials.

BACKGROUND ART

The usual medium for cultivation of plants is soil and actually soil has been utilized in the cultivation of plants on farms and in pots. It is no wonder that soil is used as the basal culture medium for plants but for a variety of reasons such as the incidence of damages due to pests inhabiting the soil, limited availability of fertile soil, labor involved in cultivation management, etc., greenhouse farming not utilizing soil has also become the order of the day in recent years. For example, a host of culture media such as rock wool, peat moss, vermiculite, etc. are available as substitutes for soil. However, whereas these media not utilizing soil have the advantage of being lightweight compared with soil, they are seriously handicapped in fertilizer-holding capacity and unavoidably require additional application of fertilizers. Moreover, any medium not utilizing soil is poor in moisture retention and/or has the problem of disposal after use. Particularly from the environmental point of view, disposal of used media is an important consideration.

Meanwhile, the soil used for growing plants is inhabited by useful microorganisms which are adapting it to the cultivation of plants. However, when the useful microorganisms in the soil have been depleted on repeated cultivation or in cultivation on soil inherently unsuited for cultivation of plants, it is common practice to employ some or other soil conditioner for rejuvenating the soil into a condition suited for cultivation. Such soil conditioners are put to use by dusting them over soil or mixing them with soil for the purpose of promoting growth of crop plants and controlling pest hazards.

As soil conditioners, those containing natural organic matter are frequently used for assisting in the growth of useful microorganisms. Moreover, in order that useful microorganisms may be directly incorporated in the soil, soil conditioners having microorganisms adsorbed thereon have also been developed. The soil conditioners commercially available under the tradenames of "Bio-Yuki", "Nenisoil", "Cobshut", etc. comprise useful microorganisms adsorbed on porous mineral supports. However, since the supports used for immobilizing microorganisms in these soil conditioners are minerals, they have the drawback that no sufficient colonization of microorganisms can be expected with such a support alone. Therefore, for aiding in the colorization and multiplication of microorganisms, microorganism-immobilizing supports supplemented with organic substances which nourish microorganisms have been developed.

As the conventional microorganism-immobilizing supports, the support prepared by admixing a porous mineral with organic substances serving as food for microorganisms and the support prepared by adding a binder to a food for microorganisms, such as sawdust, and granulating the mixture are known. And agricultural microbial materials manufactured by spraying such microorganism-immobilizing supports with a suspension of useful microorganisms, such as those for promotion of plant growth and those for pest control, have so far been in use as soil conditioners. However, since the agricultural microbial material of the first-mentioned type consists of a habitat (carrier) for microorganisms and an organic nutrient matter (e.g. polysaccharides such as cellulose) as independent units, the efficiency of utilization of the added organic matter by the microorganisms is not sufficiently high so that the rates of colonization and growth of microorganisms are disadvantageously low. On the other hand, the agricul tural microbial material of the second-mentioned type has a limited microorganism-immobilizing capacity because substantially only the surface of the support is available for the immobilization of microorganisms and, moreover, when stored for a long time, the viability of the microorganisms, particularly that of nonsporogenous microorganisms, is considerably reduced.

DISCLOSURE OF INVENTION

One object of this invention is to provide a matrix which can be used with advantage in agricultural materials such as media for cultivation of plants or supports for immobilizing microorganisms.

It is a further object of this invention to provide a medium for the cultivation of plants which is lightweight, possessed of high moisture- and fertilizer-holding capacities, easily disposable after use and benign to the environment.

Another object of this invention is to provide a microorganism-immobilizing support which has a large microorganism-immobilizing capacity and provides for markedly improved long-term viability of microorganisms and remarkably improved colonization and growth rates of microorganisms.

It is a further object of this invention to provide an agricultural microbial material comprising microorganisms immobilized on a microorganism-immobilizing support.

Other features of this invention will become apparent as the following detailed description proceeds.

In accordance with this invention, there is provided a matrix composed predominantly of polysaccharide and lignin and having an internal pore structure.

As an example of the matrix composed predominantly of polysaccharide and lignin and having an interal pore structure, feces excreted by the larva of a sheath-winged insect belonging to the superfamily Scarabaeoidea can be mentioned.

As examples of the sheath-winged insect of the superfamily Scarabaeoidea, there can be mentioned sheath-winged insects belonging to the family Scarabaeoidae and those of the family Lucanidae. As specific sheath-winged insects of the superfamily Scarabaeoidea, there can mentioned horned beetle (*Allomyrina dichotoma*), orchid beetle, larger scarab beetle, scarab beetle, long-legged scarab beetle, aphid beetle, long-legged chafer, brown velvety chafer, black chafer, frosted chafer, Japanese flower beetle, cockchafer, cupreous chafer, smaller chafer, pale brown chafer, spotted chafer, cupreous polished chafer, flower chafer, white-dotted flower chafer, tiger-banded flower chafer and larger brown flower chafer, among others. As sheath-winged insects of the family Lucanidae, there can be mentioned mountain stag beetle, serrate stag beetle, larger stag beetle, flattened stag beetle and smaller stag beetle, among others. Among these insects, horned beetles are particularly useful. Horned beetles are easy to keep and, moreover, one larva passes a large amount of feces. Especially they can be fed on the host wood used for growing *Cortinellus shiitake* mushrooms. Therefore, said feces according to this invention can be supplied in quantities and at low cost.

The matrix of this invention comprises the feces passed by the larva of any of the above-mentioned sheath-winged insects. The feces is composed of the cellulose derived from the wood on which the larva feeds and in the form of a pellet ranging from a few millimeters to a few centimeters in length. Moreover, the feces is porous with a large total air space and yet sufficiently hard to retain its shape. Because of these properties and the nature of being derived from the natural kingdom, this feces is benign to the environment, lightweight and possessed of large moisture-holding and fertilizer-holding capacities. Therefore, the matrix of this invention is not only suitable for use as a culture medium for plants but also useful as a support for fertilizers and agrochemicals or for useful microorganisms.

The feces of the larva of said sheath-winged insect for use in this invention is porous and, therefore, has a large surface area which accommodates more than 10 times the population of microorganisms which can be immobilized by the conventional microorganism-immobilizing supports. Moreover, because the larval feces of sheath-winged insects are essentially composed of polysaccharide and lignin, both of which provide food to microorganisms, and also because the microorganisms are securely protected in the internal pores of the support, it provides for a remarkably higher survival rate of various useful microorganisms including nonsporogenous microorganisms even when stored for a long period of time and for marked improvements in their colonization rate and growth rate in comparison with the conventional microorganism-immobilizing supports. Furthermore, with the matrix of this invention, those microorganisms which could not be immobilized with the conventional microorganism-immobilizing supports can be successfully immobilized.

The larval feces of said sheath-winged insect which serves as the matrix of this invention is odorless and has a sufficient hardness to resist collapsing so that the feces as such can be used as a culture medium for plants or as an immobilizing support for microorganisms. It is also possible to incorporate into the larval feces a calcium salt such as calcium sulfate, calcium hydroxide, calcium carbonate or the like and molding the composition into a suitable form for use.

The mode of use of the matrix of this invention as a culture medium for plants is now described in detail. Since the matrix of this invention is porous, it has a large moisture-holding capacity which helps to reduce the frequency of irrigation. Moreover, since it absorbs nutrient solutions with high efficiency and retains plant nutrients well as compared with other media, it provides for an improved effectiveness of fertilization. Therefore, this medium helps to promote the growth of plants to thereby enable wholesome cultivation of plants and through said reduction in the frequency of fertilizing, contributes to savings in labor. Moreover, because the feces is composed of cellulose and lignin, it does not contaminate the environment. Thus, when allowed to remain in the earth after use as the culture medium, the feces is ultimately decomposed by microorganisms.

In applying the larval feces of said sheath-winged insect as a plant culture medium, the feces can be used as it is but may likewise be put to use as admixed with soil or as impregnated with fertilizers and/or agrochemicals. The site of application of this plant culture medium may be a plowed field but in order to exploit the unique characteristics of the feces, it is utilized with particular advantage as a pot culture medium.

Furthermore, wholesome plant culture can be realized by packing planters or pots with the larval feces in lieu of soil and sowing seeds or transplanting seedlings. In addition, if a base manure or fertilizer is added, application of additional fertilizers can be dispensed with, thus contributing to labor conservation in cultivation.

The mode of use of the matrix of this invention as a microorganism-immobilizing support is now described in detail. The microorganism-immobilizing support of this invention comprises microorganisms immobilized on the above-described feces excreted by the larva of a sheath-winged insect. The microorganisms which can be immobilized are not particularly restricted but includes a broad range of useful microorganisms such as microorganisms antagonizing soil-associated pests and diseases and microorganisms which decompose the organic matter of soil to convert it into forms which can be easily utilized by plants. Such microorganisms may be those which have heretofore been utilized in this field of technology or those which have been newly isolated from the natural kingdom. They may be any of bacteria, fungi, actinomycetes, yeasts and so on.

As such microorganisms, bacteria of the genera Pseudomonas and Bacillus, sulfur bacteria, blue-green algae, bacteria of the genera Agrobacterium, Xanthomonas and Lactobacillus, etc., and fungi of the genera Aspergillus, Trichoderma and Fusarium, endotrophic mycorrhizae, fungi of the genera Penicillium and Rhizopus, etc., actinomycetes of the genus Streptomyces, etc., and yeasts can be mentioned.

In accordance with this invention, one or more kinds of the above-mentioned microorganisms are immobilized on said matrix or support. The population of microorganisms to be immobilized is not critical but generally is preferably selected from the range of about $1 \times 10^7 - 1 \times 10^9$ cells per cm$^3$ of the support.

Immobilization of microorganisms can be achieved by spraying the matrix of this invention with a suspension of microorganisms or dipping the matrix in such a microbial suspension. In the practice of this invention, the matrix of the invention is preferably sterilized prior to use for immobilization. The sterilization technique that can be used is any known sterilizing method such as autoclaving. The rationale for this sterilization prior to immobilization is as follows. In the matrix of this invention (the larval feces of a sheath-winged insect), there are preexisting microorganisms and if they are allowed to keep alive, they would compete with the microorganisms introduced by said immobilization, with the result that the desired microbial material may not be obtained.

The agricultural microbial material manufactured by immobilizing one or more kinds of the above-mentioned microorganisms (1)-(9) on the microorganism-immobilizing support can be utilized with advantage especially in the cultivation of orchids, for instance.

For application of the agricultural microbial material manufactured in the above manner as a soil conditioner, fertilizers and agrochemicals which would not affect the microorganisms inhabiting the soil may be incorporated in the conditioner. The soil conditioner according to this invention can be applied to all modes of plant culture such as paddy rice culture, plowed field culture, orchard culture, lawn culture, greenhouse culture, pot or planter culture and so on. The proportion of use of the soil conditioner should vary with different occasions and seasons of use but is generally about 2 to about 100 kg/10a and preferably about 20 to about 100 kg/10a.

In accordance with this invention, there is provided a matrix which is lightweight, possessed of high moisture-holding and fertilizer-holding capacities, easy to dispose of after use, and friendly to the environment, thus being suited for use as a plant culture medium.

In accordance with this invention, there is further provided a microorganism-immobilizing support which is capable of immobilizing a large population of microorganisms and providing for a marked improvement in the viability of the immobilized microorganisms in long-term storage and markedly enhanced colonization and growth rates of the microorganisms.

This invention further provides an agricultural microbial material comprising microorganisms immobilized on a microorganism-immobilizing support.

This agricultural microbial material comprises a large population of microorganisms immobilized in a milieu remarkably favorable for the survival, colonization and growth of the microorganisms and, therefore, when it is used as a soil conditioner, the soil is modified to suit cultivation of plants and the effect of this modification is long-lasting. When plants are grown using the so-modified soil, it can be expected that the plants will not be attacked by pathogenic microorganisms and, therefore, yield increased crops. Moreover, since the matrix comprises the feces of the larva of a sheath-winged insect which composed predominantly of polysaccharides and lignin, the soil conditioner of this invention is ultimately decomposed by microorganisms so that it does not present pollution problems.

BEST MODE OF CARRYING OUT THE INVENTION

The following examples and test examples are intended to describe this invention in further detail.

Example 1

Intercomparison of horned bettle larval feces (dried), peat moss (N.C. Corporation), Yanmar Yasai Yodo (fertilized, main ingredients=peat moss and vermiculite, Yanmar Agricultural Equipment Co., Ltd.) and Hana-no-Tsuchi (containing bark compost, Kaneya-Sha) was made in regard to specific gravity, pH and moisture-holding power ($H_2O$ g/100 ml). The results are shown in Table 1.

TABLE 1

|  | Horned bettle feces | Peat moss | Yanmar Yasai Yodo | Hana-no-Tsuchi |
| --- | --- | --- | --- | --- |
| Specific gravity | 0.21 | 0.12 | 0.25 | 0.49 |
| pH | 5.18 | 4.98 | 6.50 | 6.43 |
| Water-holding power | 52 g | 36 g | 43 g | 32 g |

Example 2

Using horned beetle larval feces (dried; unfertilized), peat moss (N.C. Corporation, unfertilized) and Akadama soil (small beads, N.C. Corporation, unfertilized), respectively, 100 cucumber seed grains (variety: Kashu-Fushinari) were sown and the germination rates on day 7 were investigated. In addition, the viability of seedings which had emerged by day 7 was investigated on day 14. The results are shown in Table 2.

TABLE 2

|  | Germination rate on day 7 | Viability of seedlings on day 14 |
| --- | --- | --- |
| Horned bettle feces | 92% | 100% |
| Peat moss | 74% | 36% |
| Akadama soil (small beads) | 31% | 43% |

Example 3

Horned bettle larval feces (dried, unfertilized) and peat moss (N. C. Corporation, unfertilized) were impregnated with a solution containing N, P and K in respective amounts equivalent to the fertilizer fraction of Yanmar Yasai Yodo (fertilized, main components=peat moss and vermiculite; Yanmar Agricultural Equipment Co., Ltd.), dried and used in the following test.

Wagner pots, 1/5000 a, were filled with the media prepared above, Yanmar Yasai Yodo and Hana-no-Tsuchi (containing bark compost, Kaneya-Sha), respectively. Then, cucumber seed grains (variety: Kashu-Fushinari) were sown and the weights of seedlings (fresh weights g) on day 22 and day 35 after sowing were investigated. The results are shown in Table 3.

TABLE 3

|  | Elemental analysis (w/v %) | | | Seedling weight (fresh weight g) After sowing | |
| --- | --- | --- | --- | --- | --- |
|  | N | P | K | Day 22 | Day 35 |
| Horned beetle feces | 0.43 | 0.43 | 0.25 | 3.7 | 11.4 |
| Peat moss | 0.43 | 0.43 | 0.25 | 1.5 | 3.2 |
| Yanmar Yasai Yodo | 0.43 | 0.43 | 0.25 | 2.9 | 6.1 |
| Hana-no-tsuchi | — | — | — | 1.1 | 2.3 |

It is apparent from Table 3 that horned beetle larval feces is superior to the commercial medium (Yanmar Yasai Yodo) in fertilizer-holding power. It can also be seen that while the larval feces of horned beetles can be used as it is alone as a culture medium, peat moss cannot be used alone but must be used as mixed with vermiculite just as it is the case with the commercial medium (Yanmar Yasai Yodo).

Example 4

Horned bettle larval feces (dried, unfertilized) and peat moss (N.C. Corporation, unfertilized) were respectively impregnated with an aqueous solution containing N, P and K in twice the equivalent amounts contained in the fertilizer fraction of Yanmar Yasai Yodo (fertilized, main components: peat moss and vermiculite, Yanmar Agricultural Equipment Co., Ltd.), dried and used in the following test.

Each of the media prepared above was mixed with Akadama soil (N.C. Corporation, unfertilized) in a ratio of 1:1 (w/w) and filled in 1/5000a Wagner pots. Similarly, Yanmar Yasai Yodo and Hana-no-tsuchi (containing bark compost, Kaneya-Sha) were also respectively filled in Wagner pots. The N, P and K contents of the mixed media were equal to the N, P and K contents of Yanmar Yasai Yodo.

After filling the pots with the test media, cucumber seed grains (variety: Kashu-Fushinari) were sown and the weights (fresh weights g) of seedlings on day 22 and day 35 after sowing were investigated. The results are shown in Table 4.

TABLE 4

|  | Elemental analysis (w/v %) | | | Seedling weight (fresh weight g) After sowing | |
| --- | --- | --- | --- | --- | --- |
|  | N | P | K | Day 22 | Day 35 |
| Horned beetle feces + Akadama | 0.43 | 0.43 | 0.25 | 4.2 | 8.7 |
| Peat moss + Akadama | 0.43 | 0.43 | 0.25 | 2.2 | 2.2 |
| Yanmar Yasai Yodo | 0.43 | 0.43 | 0.25 | 2.9 | 6.1 |
| Hana-no-tsuchi | — | — | — | 1.1 | 2.3 |

Test Example 1

(An example of utilization of antagonizing microorganisms)

(1) Preparation of test samples

A 1:1 mixture of a spore suspension of *Bacillus megatherium* and a spore suspension of *Trichoderma viridae* was prepared. Ten liters by volume of horned beetle larval feces (thoroughly dried) was evenly sprayed with 1 liter of the above spore suspension mixture and, after sufficient impregnation, air-dried in the shade. The same procedure was carried out on peat moss, vermiculite and oak sawdust.

(2) Test method

Wagner pots, 1/5000 a, were filled with commercial culture soil and the same volume of a culture of *Plasmodiophora brasicae*, which is a causative organism of clubroot in Chinese cabbage or a culture of *Phytophthora melonis*, which is a causative organism of phytophthora rot in cucumber, was sprinkled. One week after this inoculation procedure, 10 g (about 50 ml) each of the test samples prepared in (1) were added and stirred well with the soil. Two weeks after addition of the test samples, Chinese cabbage and cucumber seedlings were transplanted in the pots inoculated with *Plasmodiophora brasicae* and *Phytophthora melonis*, respectively, and the onset of disease was observed. The results are shown in Table 5.

TABLE 5

| Test sample | Chinese cabbage clubroot lesion index (after 28 days) | Cucumber phytophthora rot lesion index (after 21 days) |
| --- | --- | --- |
| Horned bettle larval feces | 12 | 23 |
| Peat moss | 93 | 100 |
| Vermiculite | 86 | 100 |
| Oak sawdust | 61 | 84 |
| Peat moss *1) | 44 | 76 |
| Vermiculite *2) | 37 | 55 |
| Control (no test sample added) | 100 | 100 |

*1): One volume of peat moss + one volume of oak sawdust (without antagonist organism)
*2): One volume of vermiculite + one volume of oak sawdust (without antagonist organism)

Test Example 2

(An example of utilization of non-pathogenic Fusarium)

(1) Preparation of test samples

A spore suspension of *Fusarium oxysporium*, a non-pathogenic fungus, was provided. Ten liters by volume of horned beetle larval feces (thoroughly dried) was sprayed with 1 liter of the above spore suspension and, after sufficient impregnation, allowed to air-dry in the shade. The same procedure was performed on peat moss, vermiculite and oak sawdust.

(2) Test method

Wagner pots, 1/5000 a, were filled with a commercial culture soil and 10 g (about 50 ml) of each test sample prepared in (1) was added and mixed well with the soil. After addition of test samples, tomato seedlings were transplanted. Two weeks after transplantation, a culture of *Fusarium oxysporium*, a causative agent of Fusarium wilt in tomato, was sprinkled in equal amounts. Three weeks after this inoculation with the pathogenic fungus, the onset of disease was observed. The results are shown in Table 6.

TABLE 6

| Test sample | Tomato Fusarium wilt lesion index (after 21 days) |
| --- | --- |
| Horned beetle larval feces | 16 |
| peat moss | 73 |
| Vermiculite | 61 |
| Oak sawdust | 75 |
| Peat moss *1) | 52 |
| Vermiculite *2) | 44 |
| Control (no sample added) | 100 |

*1): One volume of peat moss + one volume of oak sawdust (without nonpathogenic organism)
*2): One volume of vermiculite + one volume of oak sawdust (without nonpathogenic organism)

Test Example 3

(An example of use in combination with crab shell (chitin))

(1) Preparation of test samples

Ten liters by volume of horned beetle larval feces (thoroughly dried) was evenly sprayed with 2 liters of a suspension of finely divided crab shell powder and, after sufficient impregnation, allowed to air-dry in the shade. Ten liters of this crab shell powder-impregnated horned beetle larval feces was evenly sprayed with 1 liter of a spore suspension of *Streptomyces griseris* and, after thorough impregnation, allowed to air-dry in the shade. The same procedure was applied to peat moss, vermiculite and oak sawdust.

(2) Testing method

Wagner pots, 1/5000 a, were filled with a commercial culture soil and a culture of *Fusarium oxysporium*, a causative agent of cucumber Fusarium wilt, or *Verticillium dalia*, a causative of eggplant Verticillium wilt, was sprinkled in uniform volumes. One week after this inoculation with the pathogens, 10 g (about 50 ml) of each test sample prepared in (1) above was added and mixed well with the soil. Two weeks after addition of the test samples, cucumber seedlings and eggplant seedlings were transplanted into the pots inoculated with *Fusarium oxysporum* and the pots inoculated with *Verticillium dalia*, respectively, and the severity of lesions was investigated. The results are shown in Table 7.

TABLE 7

| Test sample | Cucumber Fusarium wilt lesion index (after 21 days) | Egglant Verticillium wilt lesion index (after 28 days) |
| --- | --- | --- |
| Horned beetle larval feces | 33 | 27 |
| Peat moss | 57 | 82 |
| Vermiculite | 42 | 55 |
| Oak sawdust | 53 | 78 |
| Control (no sample added | 100 | 100 |

TABLE 8

| Microorganism | Colonization rate |
| --- | --- |
| Pseudomonas | o |
| Bacillus | ⊚ |
| Aspergillus | ⊚ |
| Trichoderma | ⊚ |
| Streptomyces | o |
| Red sulfur bacteria | o |
| Blue-gleen algae | o |
| Fungi in Endotrophic mycorrhizae | o |
| Nonpathogenic Fusarium | ⊚ |

Test Example 4

Horned beetle larval feces was sterilized by autoclaving at 121° C. for 120 minutes and, then, portions were spray-inoculated with aqueous suspensions of the microorganisms shown below in Table 8. Each of the resulting microbial materials was stored in an incubator at 26° C. or 36° C. for one month and the number of viable microorganisms in each microbial material was determined by the plate dilution method to estimate the colonization ability of the microorganisms (survival rate).

The suspensions of microorganisms were adjusted to $10^{10}$ cfu/ml for bacteria and $10^8$ cfu/ml for fungi. The determination by the dilution plate method was made using meat extract agar as the assay medium and cultivation was carried out 25° C. for 72 hours.

The results are presented in Table. 8. The evaluation schema shown in Table 8 is based on the density of microorganisms after one-month-long storage, where ⊚ represents $\geq 10^{10}$ for bacteria and actinomycetes and $\geq 10^8$ for fungi; o represents $10^9$–$10^{10}$ for bacteria and actinomycetes and $10^7$–$10^8$ for fungi; A represents $10^8$–$10^9$ for bacteria and actinomycetes and $10^6$–$10^7$ for fungi; and x represents $<10^8$ for bacteria and actinomycetes and $<10^6$ for fungi.

It is apparent from Table 8 that exceedingly high colonization rates can be obtained for sporogenous microorganisms (bacteria of the genus Bacillus, fungi of the genus Aspergillus, fungi of the genus Trichoderma, and nonpathogenic fungi of the genus Fusarium) and that practically useful colonization rates can be obtained even for non-sporogenous microorganisms (bacteria of the genus Pseudomonas, actinomycetes of the genus Streptomyces, red sulfur bacteria, blue-green algae and fungi in endotrophic mycorrhizae).

We claim:

1. A method of cultivating a plant comprising sterilizing a matrix support and immobilizing a microorganism on said matrix support to form an agricultural microbial material wherein said matrix support comprises larval feces of a horned beetle and applying said matrix immobilized microbial material as a soil conditioner.

2. The method of claim 1, wherein the microorganism is at least one member selected from the group consisting of bacteria, fungi, actinomycetes and yeasts.

3. The method of claim 1 or 2 wherein $1\times10^7$ to $1\times10^9$ cells of the microorganism are immobilized per 1 cm³ of the matrix support.

4. The method of claim 1 wherein the agricultural microbial material is used in a proportion of 2 to 10 kg/10 a.

\* \* \* \* \*